Patented Oct. 31, 1950

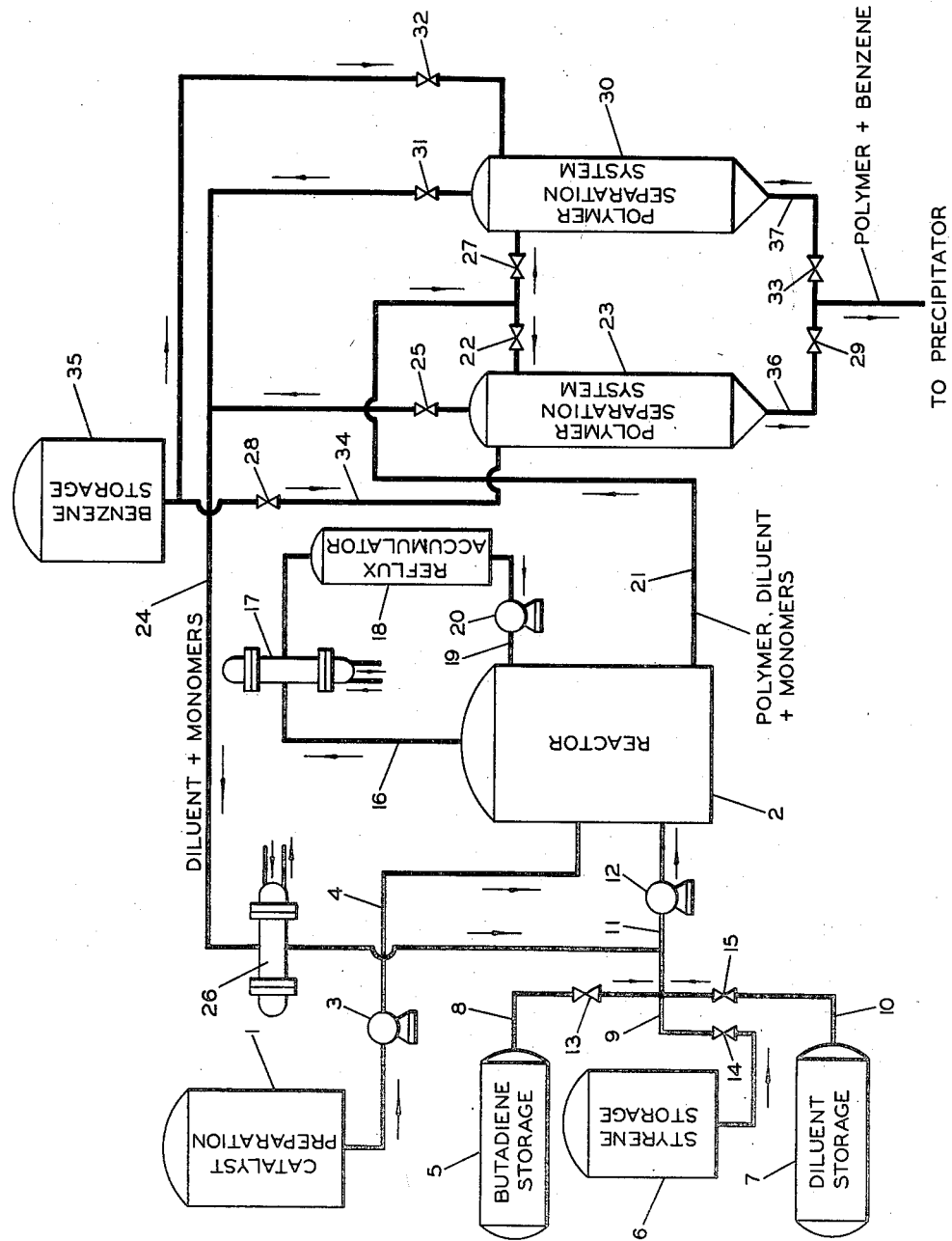

2,527,768

UNITED STATES PATENT OFFICE 2,527,768

METHOD FOR THE POLYMERIZATION OF UNSATURATED MATERIALS WITH AN ALKALI METAL CATALYST

Walter A. Schulze and John C. Hillyer, Bartlesville, Okla., assignors to Phillips Petroleum Company, a corporation of Delaware Application June 17, 1946, Serial No. 677,354

6 Claims. (Cl. 260—83.7)

The present invention relates to an improved process for the polymerization of polymerizable organic compounds. In one of its more specific aspects it relates to a continuous process for the mass polymerization of conjugated diolefins. In another of its specific aspects this invention relates to a continuous process for the mass copolymerization of butadiene and styrene in the presence of an alkali metal contact catalyst.

The polymerization of unsaturated polymerizable organic compounds by heat has long been known. This procedure has been applied to the polymerization of conjugated diolefins and is known as mass polymerization in contradistinction to emulsion polymerization which designates the polymerization of diolefins in aqueous dispersions. The mass polymerization of conjugated diolefins, especially of 1,3-butadiene, isoprene, and 2,3-dimethylbutadiene, has long been known to be capable of producing high polymers or synthetic elastomers having high elasticity and resembling natural gum rubber. While the reaction is essentially one of thermal polymerization it has been found that alkali metals, particularly sodium and potassium, accelerate the reaction markedly. In spite of the demand for improved synthetic elastomers, the difficulties attendant upon this type of polymerization have made it unattractive and have retarded commercial development of the process. One of the major problems which has confronted the development of mass polymerization has been the dissipation of the heat of polymerization. If this heat is not dissipated rapidly polymers of poor quality are produced and, in addition, charring of the product, serious explosions, fires, and so forth, are likely to occur. Failure to solve these important technical problems directed emphasis to polymerization of the monomers in aqueous emulsions. Even though the emulsion polymerization process has been developed and is used widely on a commercial scale, the elastomers produced possess certain properties which render them inferior to natural rubber for many uses.

The present invention provides a process especially suited for the mass polymerization of polymerizable organic compounds catalyzed by an alkali metal. It provides an improved process particularly applicable to the polymerization of conjugated diolefins wherein the polymerization may be carried out continuously without the mechanical limitations of the processes of the prior art. As stated hereinbefore one of the major difficulties with prior art processes was the failure to obtain accurate temperature control. Another difficulty is brought about by the fact that during the polymerization reaction the polymerizate becomes very viscous with the result that agitation is hindered, the product obtained is not uniform, and removal of the polymer from the polymerization vessel is extremely difficult. By the process of the present invention both the temperature and the viscosity of the polymer are under control at all times and a very uniform product may be produced. The polymerization process of the present invention is particularly adapted to mass copolymerization of butadiene and styrene monomers to form rubber-like elastomers.

An object of the present invention is to provide a novel process for the polymerization of polymerizable organic compounds. Another object of the present invention is to provide a continuous process for the polymerization of organic materials using an alkali metal as a catalyst. A more specific object is to provide such a process for the mass copolymerization of butadiene and a monomer copolymerizable therewith by catalysis with a comminuted alkali metal. Another object is to provide such a process which is particularly suited to the mass copolymerization of butadiene and styrene.

The accompanying drawing represents diagrammatically a preferred arrangement of apparatus for carrying out the process of the present invention.

We have now found a method whereby mass polymerization reactions may be effected in such a way that the drawbacks and operational difficulties of previous processes are almost completely eliminated. According to our process the heat of the reaction is readily dissipated and the temperature satisfactorily controlled through the use of suitable diluents which serve as a medium for heat transfer.

Diluents employed in the process of the present invention also serve to control the rate of the polymerization reaction and the viscosity of the polymer. This process also provides for the continuous polymerization of monomeric materials catalyzed by alkali metals and for the continuous removal of the catalyst.

In a general embodiment our invention comprises a continuous process for carrying out the mass polymerization of conjugated diolefins, or copolymerization of diolefins with other monomers, such as styrene, in the presence of a large amount of a relatively low boiling, inert diluent. When a diluent having a lower boiling point than either of the monomers is employed, the heat of polymerization effects vaporization of said diluent without any appreciable removal of the monomers from the locus of the reaction. Thus a very effective means of heat transfer is provided when mass polymerization reactions are carried out according to this process.

The mass polymerization reactions described herein are catalyzed by suspensions of finely divided alkali metals. Dispersions of alkali metal catalysts particularly suited for carrying out the process of the present invention are disclosed in the copending patent applications of W. W. Crouch, Serial No. 671,899, filed May 23, 1946, and Serial No. 671,900, filed May 23, 1946. These are now Patents 2,483,886 and 2,483,887, respectively, granted October 4, 1949. In the operation of our process provision is made for simultaneously introducing into the reactor the catalyst suspension and a mixture containing controlled proportions of the monomers and diluent. Inlets for the continuous introduction of the reactants and catalyst may be located at convenient points in the reactor depending upon the design of the equipment and the means of agitation employed. The reactor is usually provided with a stirring device or other agitating means but, if desired, agitation may be effected by introducing the catalyst suspension at an inlet near the top of the reactor and the reactants-diluent mixture at a point near the bottom. The vigorous boiling of the diluent caused by the heat of the reaction also serves as an aid in maintaining adequate contact between the reactants and catalyst. The diluent is preferably lower boiling than the diolefin employed and, therefore, is caused to vaporize by absorbing the exothermic heat of the reaction. Thus by controlling the rate of addition of the monomers and the amount of diluent employed it is possible to maintain the reaction temperature at the desired level. Rise in temperature as the reaction proceeds is avoided by providing a means for cooling the vaporized diluent which is maintained under reflux. Since the partial pressure of the diluent vapor is sufficient to reduce the vaporization of the monomers to a negligible quantity, the ratio of reactants and catalyst may be easily controlled. The diluent employed is a material in which the polymer is insoluble, or of low solubility, and of such nature that it does not swell the polymer but causes it to remain in a sufficiently fluid state to flow out of the reactor at a continuous but controlled rate. It is obvious that the process of this invention provides a superior method for effecting heat transfer throughout the entire polymerization operation and at the same time the vapor pressure of the diluent serves as a means for holding the diolefin down in the reaction vessel.

The polymer suspension is withdrawn from the reactor in a continuous stream and fed to a polymer separation system where the diluent and unreacted monomers are removed and recycled to the reactor. The polymer, containing a small quantity of the catalyst, may be dissolved in a suitable solvent, such as benzene, and the resulting solution treated with a precipitating agent, such as methanol, or the polymer may be washed with water on a wash mill. This treatment destroys the catalyst and leaves the polymer ready for processing.

In carrying out the mass polymerization process of this invention for the copolymerization of butadiene and styrene, 75 parts of butadiene and 25 parts of styrene are generally employed. However, the ratio of the monomers may be varied over a considerable range depending upon such factors as the type of polymer desired, the amount of diluent employed, the reaction conditions, etc. The amount of catalyst may be varied within certain limits but it usually lies within the range of 0.1 to 1.0 part per 100 parts of monomers. Since the properties of the polymer vary considerably with the amount of catalyst used, it is necessary to study each case in order to determine the quantity of catalyst required to produce the desired result. The amount of diluent may range from 50 to 400 parts or more per 100 parts of monomers with 100 to 250 parts generally preferred. The amount of diluent employed is an important factor since it has an appreciable effect on the polymerization rate and also serves as the heat transfer medium to control the reaction temperature. The polymerization temperature is usually held within the range 20 to 60° C.

In order to set forth more specifically the process of this invention, reference is made to the accompanying drawing. In this explanation reference is made to specific comonomers and also to a specific method of polymer treatment. It is to be understood, however, that variations in both materials and methods may be made without departing from the scope of the disclosure.

A finely divided suspension of alkali metal catalyst from the catalyst preparation system 1 is introduced into reactor 2 by means of pump 3 and line 4. Simultaneously butadiene from storage tank 5, styrene from tank 6 and inert low-boiling diluent from tank 7 are fed through lines 8, 9 and 10, respectively, into the common feed line 11 and introduced into reactor 2 by means of pump 12 located in line 11. Valves 13, 14, and 15 located in lines 8, 9 and 10 serve to control the flow of butadiene, styrene, and diluent, respectively. The heat generated upon contact of the monomers with the catalyst serves to vaporize the diluent and thereby build up pressure in the reactor. The vaporized diluent passes through line 16, is condensed in condenser 17, collected in reflux accumulator 18, and returned to the reactor through line 19 by pump 20. A mixture of polymers with unreacted monomers and inert diluent is withdrawn from reactor 2 through line 21 and valve 22 and introduced into the polymer separation system 23 where the diluent and monomers are removed through line 24 and valve 25 and returned to the feed line 11 after condensation in condenser 26. During this part of the operation valves 27, 28 and 29 are closed. After sufficient polymer has accumulated in unit 23, valve 22 is closed and valve 27 is opened to allow the polymer stream from reactor 2 to flow into the system 30. When the remainder of unreacted monomers and diluent is removed from system 23, valve 25 is closed and valve 28 is opened. Simultaneously the system 30 is put into operation with valve 31 opened and valves 32 and 33 closed.

The polymer-catalyst mixture remaining in the separation system 23 is treated with a solvent such as benzene to effect solution of the polymer. Valve 28 in line 34 is opened to admit benzene from storage tank 35 to the separation unit 23. Solution of the polymer is facilitated by means of any conventional agitating device which is provided. After solution of the polymer is complete, valve 29 is opened and the mixture is withdrawn through line 36 and transferred to a precipitator where a precipitating agent such as methanol is added. This treatment also serves to destroy metal catalyst carried over with the polymer from reactor 2.

System 23 is again ready to be used as previously described while the polymer-catalyst mixture which has accumulated in 30 is treated with solvent and the solution withdrawn through line 37 and valve 33.

From the foregoing discussion it is obvious that at least two polymer separation units are necessary for satisfactory and economical operation of our process. Thus, while the polymer stream from reactor 2 is flowing into one unit, benzene is being added to the second unit to dissolve the polymer which is then withdrawn and fed to the precipitator. By using these polymer separation units alternately, reactor 2 may be kept in constant operation and any difficulties involving excessive polymer accumulation in systems 23 and 30 may be avoided. If desired, polymer may be removed from units 23 and 30 by any suitable mechanical means and washed with water on a wash mill to destroy the catalyst instead of using a solvent such as benzene followed by treatment with a precipitating agent.

Since reactor 2 is operated under pressure, pump 12 in line 11 is provided as a means of aiding the introduction of the monomer-diluent mixture and also insuring better contact of the reactants and catalyst if no other means of agitation is provided. The flow of monomer-diluent recycle stream is also facilitated by means of the pump. Likewise pump 3 in line 4 is provided for charging the catalyst suspension to the reactor. Valves 13, 14, and 15 in lines 8, 9, and 10 serve as a means of regulating the ratio of reactants and diluent.

The process of this invention is particularly adapted to the mass copolymerization of diolefins such as 1,3-butadiene, isoprene, 2,3-dimethyl butadiene and the like with comonomers such as styrene. As hereinbefore stated, failure to find a satisfactory means of temperature control has prevented development of such a process. We have found that through the proper choice of a diluent and through the continuous introduction of reactants and catalyst in controlled proportions, the temperature of the reaction may be satisfactorily regulated and polymers of constant molecular weight, Mooney viscosity, etc. may be obtained. Furthermore, since our invention comprises carrying out mass polymerization as a continuous process, much higher yields of polymer may be reaized than have heretofore been possible.

The diluents suitable for use in this invention are inert materials such as paraffinic hydrocarbons with boiling points lower than either of the monomers employed. While the diolefin generally has the lower boiling point, there may be cases where this condition does not necessarily exist. Isobutane is most generally used as the diluent in butadiene-styrene systems or in other butadiene-comonomer systems. However, propane and normal butane are also applicable. When higher boiling comonomers are employed, other diluents such as normal and isopentane may be used.

The catalysts of this invention comprise finely divided suspensions of alkali metals with sodium and potassium being most generally preferred. The preparation of the catalyst involves charging a dispersion medium such as xylene to any conventional type of reaction vessel where it is heated to about 100° C. or higher in an atmosphere of dried oxygen-free nitrogen after which the freshly cut metal such as sodium is added. The amount of metal employed is usually within the range of 5 to 35 per cent by weight, based on the dispersing medium, with a range of about 10 to 20 per cent usually preferred. The temperature is adjusted to about 110° C. and the mixture agitated at high speed (5,000 to 10,000 R. P. M.) from about five to about sixty minutes or until a stable dispersion is produced. The system is allowed to cool to about 100° C. and agitation is stopped. A catalyst thus prepared is ready for introduction into the polymerization reactor.

The reaction time required to effect the desired degree of polymerization varies with the amount of diluent employed, the temperature, the effectiveness of contact of the reactants with the catalyst, and the like. These factors may be satisfactorily controlled when the process described herein is employed for carrying out mass polymerization reactions.

*Example*

A finely divided sodium catalyst was prepared in the following manner: 32 parts by weight of sodium was charged to a reaction vessel containing 160 parts by weight of dry xylene and the contents heated to 110° C. after which stirring was started. Stirring was continued at the rate of 9,000 to 10,000 R. P. M. for twenty minutes. The system was then allowed to cool to 100° C. after which the stirring was stopped. The preparation of the catalyst was carried out in an atmosphere of nitrogen to prevent oxidation of the sodium. The average particle size of the catalyst was about 0.02 mm.

A mixture comprising reactants and diluent in the ratio of 75 parts butadiene, 25 parts styrene and 100 parts isobutane diluent was fed, at a controlled rate, into a polymerization reactor provided with a stirrer and a water cooled condenser. Simultaneously the catalyst suspension, prepared as previously described, was introduced slowly into the reactor at such a rate as to maintain a ratio of 0.6 part catalyst per 100 parts of monomers. The temperature was held at 30° C., regulation being effected by the controlled rate of addition of reactants. The reactor contents were stirred continuously. As the reaction proceeded and polymer accumulated, the suspension of polymer, diluent and unreacted monomers was withdrawn slowly in a continuous stream and fed to a polymer separator where the unreacted monomers and diluent were removed and recycled to the reactor. The polymer which collected in the polymer separation unit was removed by treatment with benzene and the solution was transferred to a precipitator where methanol was added to destroy the catalyst and precipitate the polymer. In order to withdraw the polymer suspension in a continuous stream from the reactor, two polymer separators were provided and were used alternatively. While polymer was being removed from one unit the stream from the reactor was fed into the other. Thus a continuous operation was maintained. The intrinsic viscosity of the polymer was 3.04. No gel was formed in the reaction.

Since certain changes may be made in carrying out the above method without departing from the scope of the invention, it is intended that all matters contained in the above description shall be interpreted as illustrative and not in a limiting sense.

We claim:

1. In a process for the copolymerization of butadiene and styrene in the presence of a finely-divided alkali metal as polymerization catalyst, the improvement which comprises continuously passing said monomer reactants as liquids to a reaction zone together with a low-boiling liquid paraffin hydrocarbon of the group consisting of propane and the butanes, in an amount between 50 and 400 parts by weight per 100 parts of said monomer reactants, reacting said monomers in said reaction zone in the presence of a finely divided alkali metal as catalyst, maintaining a reaction temperature between 20 and 60° C. and a pressure such that said low-boiling paraffin continuously vaporizes at said reaction temperature, continuously withdrawing from said reaction zone vapors of said low-boiling paraffin at a rate such that vaporization thereof takes up exothermic heat of reaction and said reaction temperature is thereby maintained, continuously cooling and condensing said vaporized low-boiling paraffin and returning resulting condensed liquid to said reaction zone, continuously passing from said reaction zone a stream comprising said low-boiling paraffin and polymers so produced, vaporizing low-boiling material from said stream, and treating resulting polymers to separate therefrom entrained alkali metal catalyst.

2. In the process of claim 1, dissolving said resulting polymers in benzene, and separating a catalyst-free polymer from a resulting benzene solution by admixing methanol with said solution and precipitating said catalyst-free polymer.

3. In the process of claim 1, intimately admixing water with said resulting polymers, whereby said alkali metal catalyst reacts with said water and is removed in said water.

4. In a process for the copolymerization of 1,3-butadiene and styrene in the presence of finely divided sodium as the polymerization catalyst, the improvement which comprises continuously passing a liquid stream comprising butadiene and styrene together with isobutane in an amount between 100 and 250 parts by weight per 100 parts of said butadiene-styrene mixture to a reaction zone containing a liquid zone and a vapor zone, continuously adding to said liquid zone a stream of liquid xylene containing suspended therein sodium particles having an average particle size of 0.02 mm. in an amount of 0.1 to 1.0 part sodium per 100 parts by weight of said butadiene-styrene mixture, continuously removing vapors comprising isobutane from said vapor zone and cooling and condensing same and returning all material so removed to said reaction zone as a liquid, maintaining in said reaction zone a temperature between 20 and 60° C., continuously withdrawing from said reaction zone as the sole net effluent withdrawn therefrom a stream comprising said isobutane, unreacted butadiene and styrene, resulting polymer and finely divided sodium, separating from said stream a vapor fraction comprising said isobutane and said unreacted butadiene and styrene, separating also from said stream a polymer-sodium mixture, dissolving polymers in said mixture in benzene, admixing methanol with the resulting solution, and recovering resulting sodium-free polymers so produced.

5. In a process for the polymerization of a conjugated diolefin in the presence of a finely divided alkali metal as the polymerization catalyst, the improvement which comprises continuously passing a liquid stream comprising such a diolefin together with a lower-boiling paraffin hydrocarbon of the group consisting of propane and the butanes in an amount between 100 and 250 parts by weight per 100 parts of said diolefin-containing mixture to a reaction zone containing a liquid zone and a vapor zone, continuously adding to said liquid zone a stream of liquid containing suspended therein particles of an alkali metal catalyst having an average particle size of 0.02 mm. in an amount of 0.1 to 1.0 part metal per 100 parts by weight of said diolefin-containing mixture, continuously removing vapors comprising low-boiling paraffin from said vapor zone and cooling and condensing same and returning all material so removed to said reaction zone as a liquid, maintaining in said reaction zone a temperature between 20 and 60° C., continuously withdrawing from said reaction zone as the sole net effluent withdrawn therefrom a stream comprising said low-boiling paraffin, unreacted diolefin, resulting polymer and finely divided alkali metal, separating from said stream a vapor fraction comprising said low-boiling paraffin and said unreacted diolefin, separating also from said stream a polymer-catalyst mixture, dissolving polymers in said mixture in benzene, admixing methanol with the resulting solution, and recovering resulting alkali metal-free polymers so produced.

6. In a process for the polymerization of a conjugated diolefin in the presence of a finely divided alkali metal as the polymerization catalyst, the improvement which comprises continuously passing a liquid stream comprising such a diolefin together with a lower-boiling paraffin hydrocarbon of the group consisting of propane and the butanes in an amount between 100 and 250 parts by weight per 100 parts of said diolefin-containing mixture to a reaction zone containing a liquid zone and a vapor zone, continuously adding to said liquid zone a stream of liquid containing suspended therein particles of an alkali metal catalyst having an average particle size of 0.02 mm. in an amount of 0.1 to 1.0 part metal per 100 parts by weight of said diolefin-containing mixture, continuously removing vapors comprising low-boiling paraffin from said vapor zone and cooling and condensing same and returning all material so removed to said reaction zone as a liquid, maintaining in said reaction zone a temperature between 20 and 60° C., continuously withdrawing from said reaction zone as the sole net effluent withdrawn therefrom a stream comprising said low-boiling paraffin, unreacted diolefin, resulting polymer and finely divided alkali metal, and recovering therefrom resulting polymers.

WALTER A. SCHULZE.
JOHN C. HILLYER.

REFERENCES CITED

The following references are of record in the file of this patent:

UNITED STATES PATENTS

| Number | Name | Date |
|---|---|---|
| Re. 22,210 | DeSimo | Oct. 27, 1942 |
| 2,185,656 | Waterman et al. | Jan. 2, 1940 |
| 2,327,080 | Walker | Aug. 17, 1943 |
| 2,483,886 | Crouch | Oct. 4, 1949 |

FOREIGN PATENTS

| Number | Country | Date |
|---|---|---|
| 345,939 | Great Britain | Mar. 16, 1931 |
| 802,707 | France | Sept. 14, 1936 |